United States Patent
Chiou et al.

(10) Patent No.: US 8,131,296 B2
(45) Date of Patent: Mar. 6, 2012

(54) METHOD AND SYSTEM FOR HANDOVER AUTHENTICATION

(75) Inventors: Shin-Yan Chiou, Jhubei (TW);
Hung-Min Sun, Hsinchu (TW);
Shih-Ying Chang, Nantou (TW);
Yue-Hsun Lin, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 669 days.

(21) Appl. No.: 12/195,652

(22) Filed: Aug. 21, 2008

(65) Prior Publication Data

US 2010/0046467 A1 Feb. 25, 2010

(51) Int. Cl.
*H04W 36/00* (2009.01)
(52) U.S. Cl. ......... 455/436; 455/437; 455/411; 370/331
(58) Field of Classification Search .................. 455/436, 455/437, 411; 370/331
See application file for complete search history.

(56) References Cited

U.S. PATENT DOCUMENTS

| 7,158,777 | B2 | 1/2007 | Lee et al. | |
|---|---|---|---|---|
| 7,236,477 | B2 | 6/2007 | Emeott et al. | |
| 2008/0267407 | A1* | 10/2008 | Vanderveen | 380/277 |
| 2008/0285749 | A1* | 11/2008 | Suh et al. | 380/45 |
| 2009/0172798 | A1* | 7/2009 | Upp | 726/10 |
| 2010/0228980 | A1* | 9/2010 | Falk et al. | 713/171 |
| 2011/0007742 | A1* | 1/2011 | Leung et al. | 370/389 |

FOREIGN PATENT DOCUMENTS

| CN | 1630405 A | 6/2005 |
|---|---|---|
| CN | 101212798 A | 7/2008 |

OTHER PUBLICATIONS

Leonardo Maccari et al., "Secure, fast handhoff techniques for 802.1X based wireless network", 2006 IEEE, 1-4244-0355-3/06.
Krishna Sankar et al., "EAP Authentication Protocols for WLANs", Feb. 18, 2005, www.ciscopress.com/articles/printerfriendly.asp?p=369223.
Office Action dated Aug. 10, 2011 in corresponding Chinese Application No. 200810190366.4 (5 pages).

* cited by examiner

*Primary Examiner* — Barry Taylor
(74) *Attorney, Agent, or Firm* — Finnegan, Henderson, Farabow, Garrett & Dunner, LLP

(57) ABSTRACT

A handover authentication method includes performing, by a wireless network server, a first authentication between a client and the wireless network server via a first network gateway; obtaining first authentication keys for the wireless network server and the client based on the first authentication; determining, by the wireless network server, a need to handover the client from the first network gateway to a second network gateway; deriving, by the wireless network server and from the first authentication keys, a handover authentication key shared by the client and the wireless network server; obtaining, by the wireless network server, second authentication keys for the network server and the client; and serving, by the wireless network server, the client via the second network gateway.

17 Claims, 4 Drawing Sheets

METHOD AND SYSTEM FOR HANDOVER AUTHENTICATION

TECHNICAL FIELD

Systems and methods disclosed herein relate to the field of wireless networking and, more specifically, to systems and methods that perform handover authentication in wireless networks.

DESCRIPTION OF THE RELATED ART

Conventional wireless network environments connect mobile electronic devices to a service provider. More specifically, WiMAX (Worldwide Interoperability for Microwave Access) network environments connect a client device, through intermediate connections, to, for example, the internet. WiMAX is a wireless networking technology that provides communication to wireless devices over significant distances. Reauthentication delays, however, can slow communication with the client device and decrease the efficiency of a WiMAX environment.

FIG. 1 shows a conventional WiMAX environment. Access to Internet 100 is provided to at least one CSN (Connectivity Service Network) 110, using at least one AAA (Authentication, Authorization, and Accounting) server 120. CSN 110 is connected to an ASN (Access Service Network) gateway 130. Only two ASN gateways 130 and 131 are shown, but it is possible to have greater or fewer depending on the number of required base stations. ASN 130 or 131 is typically connected to several base stations, also generally referred to as access points, 140-145, depending on network demands in a given area, though an ASN may instead be connected to only a single base station.

In FIG. 1, six base stations are shown as an exemplary WiMAX environment, but greater or fewer base stations may be provided based on the number of available ASNs and the network demands in the WiMAX environment. One of base stations 140-145 communicates with a mobile client 150 to provide client 150 with wireless network service. Although FIG. 1 illustrates the single mobile client 150 served by base station 140, the network needs of several mobile clients may be satisfied by a single base station. The number of mobile clients in a given area determines the number of base stations that are necessary to serve that given area. When the number of mobile clients increases such that network demand surpasses the service capacity of a single base station, another base station may be added. Similarly, the number of required base stations generally determines the number of ASNs necessary to provide service to the base stations.

In the conventional WiMAX environment, such as shown in FIG. 1, each time mobile client 150 is initially served by an ASN gateway, e.g., ASN gateway 130 or 131, via an associated base station, it is necessary to authenticate mobile client 150. Then so long as mobile client 150 moves in areas that enable continued service via the original authenticating ASN gateway, no further authentication is required. However, if mobile client 150 moves to an area served by a different ASN gateway, mobile client 150 is handed over to the different ASN gateway, so that it is necessary for that different ASN gateway to reauthenticate mobile client 150 as part of the handover processing, before service can be provided. Such reauthentication introduces delay in providing service to mobile client 150.

Conventional solutions for minimizing reauthentication delays are insufficient to appreciably increase the efficiency of a WiMAX environment. One conventional solution is to predict where a client device is likely to move and to perform necessary authentication before the authentication is necessary. However, this solution can lead to inaccuracies since predictions of movement may be incorrect. Even if the accuracy of the predictions could be improved, prediction may be undesirable because a model used to predict a movement of a client may add burden to a WiMAX network. In this regard, access points in the network would need to store information about the model, thereby creating a burden on operation of the access points. Such burden is increased when multiple client devices operate within the same WiMAX environment since access points must store significant amounts of information related to predicted movements and models for such movements, even though that information may or may not be used.

Authentication protocol standards have been created to standardize advance authentication techniques. These standards are included in IEEE standards 802.11, 802.11i, and 802.16x. Such advance authentication techniques, however, require authentication before handover is to be made. In some instances, during the handover process a mobile client device is communicating with a pre-handover access point, which is in turn communicating with the post-handover access point. Disadvantageously, such operations can divert access point resources because the resources of two access points are required for communicating with one mobile client.

In some conventional WLAN (wireless local area network) authentication schemes, a mobile client is equipped with predetermined codes promulgated by the AAA server. When a handover is to be executed, the client transmits the codes to the access point. The access point in turn authenticates the code with the AAA server. Since this scheme has fewer steps, it has a limited effect on the overall speed of communication in the WLAN environment. However, these WLAN schemes are not suitable for use in a mobile WiMAX environment because WiMAX does not provide a secure channel between ASN gateways to protect transmitted information.

Furthermore, the WiMAX forum, the entity that standardizes WiMAX protocols, requires all WiMAX systems to be able to generate MSK (Master Session Key) and EMSK (Extended Master Session Key) keys to achieve two-way authentication. WLAN improvement methods are unable to meet this requirement because the WLAN methods only offer one-way authentication or, in the alternative, do not generate MSK or EMSK keys. A need therefore exists to increase handover authentication speed in a mobile WiMAX environment using methods that satisfy unique requirements of the WiMAX protocols.

SUMMARY

Consistent with embodiments of the invention, a method for a handover authentication method in a wireless network is disclosed. The method may include performing, by a wireless network server, a first authentication between a client and the wireless network server via a first network gateway; obtaining first authentication keys for the wireless network server and the client based on the first authentication; determining, by the wireless network server, a need to handover the client from the first network gateway to a second network gateway; deriving, by the wireless network server and from the first authentication keys, a handover authentication key shared by the client and the wireless network server; obtaining, by the wireless network server, second authentication keys for the network server and the client; and serving, by the wireless network server, the client via the second network gateway.

Also consistent with embodiments of embodiments of the invention is a handover authentication method in a wireless network. The method may include performing, by a wireless network server, a first authentication between a client and the wireless network server via a first network gateway; obtaining first authentication keys for the wireless network server and client based on the first authentication; determining, by the wireless network server, a need to handover the client from the first network gateway to a second network gateway; deriving, by the wireless network server and from the first authentication keys, second authentication keys shared by the client and the wireless network server; and serving, by the wireless network server, the client via the second network gateway based on the second authentication keys.

Consistent with yet other embodiments of the invention is a network server for operating in a network serving a wireless client. The server may include means to perform a first authentication between a client and the wireless network server via a first network gateway; means to obtain first authentication keys for the wireless network server and the client based on the first authentication; means to determine a need to handover the client from the first network gateway to a second network gateway; means to derive, from the first authentication keys, a handover authentication key shared by the client and the wireless network server; means to obtain second authentication keys for the network server and the client; and means to serve the client via the second network gateway.

Consistent with yet another embodiment of the invention is a network server for operation in a network serving a wireless client. The server may include means to perform a first authentication between a client and the wireless network server via a first network gateway; means to obtain first authentication keys for the wireless network server and the client based on the first authentication; means to determine a need to handover the client from the first network gateway to a second network gateway; means to derive, from the first authentication keys, second authentication keys shared by the client and the wireless network server; and means to serve the client via the second network gateway based on the second authentication keys.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, those skilled in the art will further appreciate that the techniques and embodiments may also be practiced in other network types.

Reference will now be made in detail to the exemplary embodiments of the invention, examples of which are illustrated in the accompanying drawings. Wherever possible, the same reference numbers will be used throughout the drawings to refer to the same or like parts.

Figure 1:
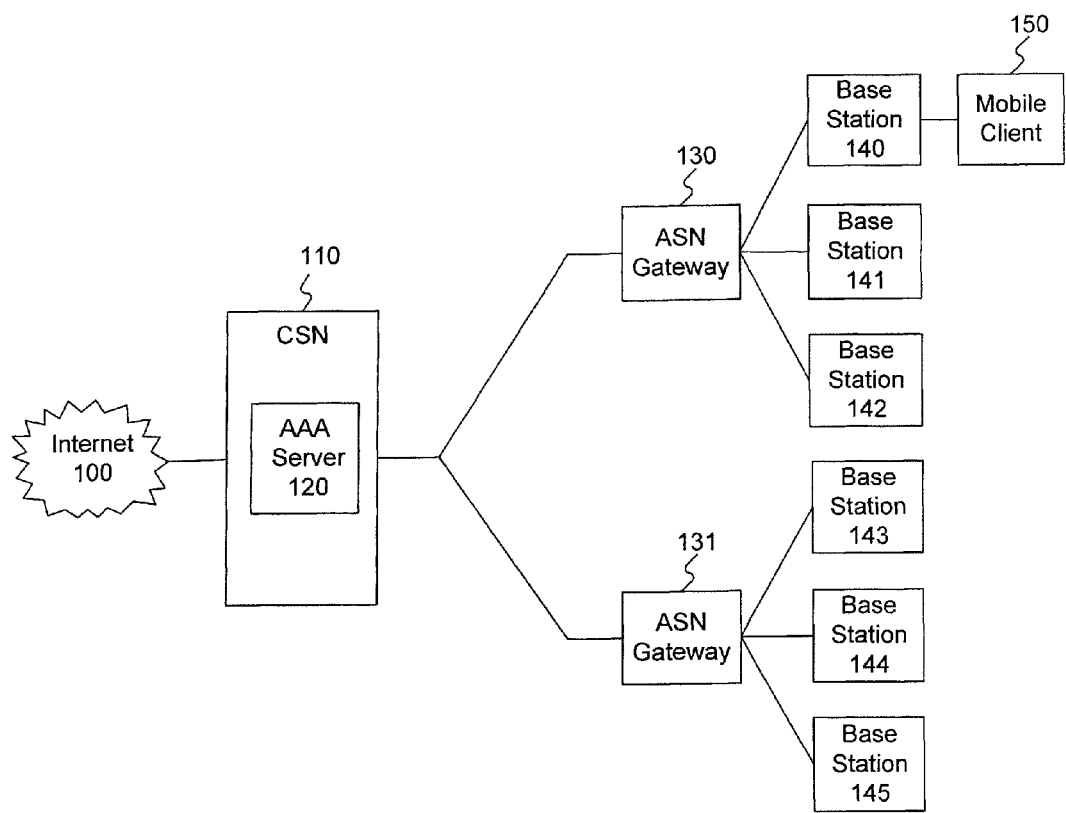
FIG. 1 is a block diagram of a conventional WiMAX wireless network environment.
Figure 2:
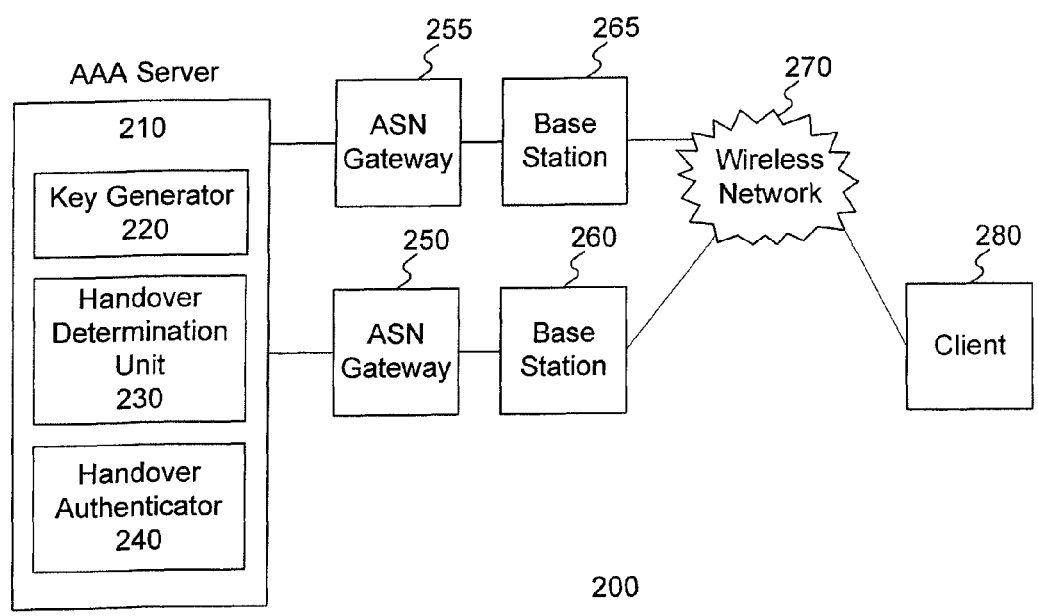
FIG. 2 is a block diagram illustrating a WiMAX system consistent with an embodiment of the invention.

FIG. 2 is a block diagram illustrating a mobile WiMAX network 200 consistent with an embodiment of the invention. For purposes of description, a wireless WiMAX network environment will be described, but other types of wireless networks may be used. Examples of wireless networks that may employ embodiments of the invention include, but are not limited to, WiMAX, WiFi, and WLAN. WiMAX network 200 includes a wireless network server such as, for example, a AAA server 210 that includes a key generator 220, a handover determination unit 230, and a handover authenticator 240. Network 200 may include two ASN gateways 250 and 255 coupled to AAA server 210, and two base stations 260 and 265 coupled to ASN gateways 250 and 255, respectively. Couplings between AAA server 210, ASN gateways 250 and 255, and base stations 260 and 265, may be wired. Network gateways may include ASN gateways 250 and 255, as well as base stations 260 and 265. Network 200 further includes a wireless network 270 and a mobile client device 280. Although FIG. 2 shows one AAA server, two ASN gateways, two base stations, one will recognize that network 200 may include additional components.

Components of network 200, including AAA server 210, ASN gateways 250 and 255, base stations 260 and 265, and mobile client 280 may each include a combination of one or more application programs and one or more hardware components. For example, application programs run by AAA server 210, ASN gateways 250 and 255, base stations 260 and 265, and mobile client device 280, may include software modules, sequences of instructions, routines, data structures, display interfaces, and other types of structures that execute operations of the present invention. Further, hardware components may include a combination of central processing units (CPUs), buses, memory devices, storage units, data processors, input devices, output devices, network interface devices and other types of components that will become apparent to those skilled in the art.

AAA server 210 provides authentication, authorization, and accounting services to a mobile client. Protocols and procedures for performing authentication, authorization, and accounting are provided as part of the internal framework of AAA server 210. As AAA server 210 executes these protocols and procedures, authentication, authorization, and accounting for subscribed services are provided to the mobile client and the user of the mobile client.

Mobile clients may be mobile electronic devices. In particular, such mobile devices may include WiMAX phones, WiMAX CPE, laptop computers, personal digital assistants (PDAs), and other devices enabling mobile communication.

With reference to FIG. 2, AAA server 210 is coupled to serve mobile client device 280 through ASN gateway 250, base station 260 and wireless network 270 or through ASN gateway 255, base station 265, and wireless network 270.

For convenience of explanation only, FIG. 2 shows two ASN gateways 250 and 255 and two base stations 260 and 265 servicing the single client device 280. It is to be understood, however, that one AAA server may be coupled to many ASNs which may in turn be coupled with many base stations servicing many client devices found within the base station's effective communication range. Though not shown for simplicity of description, it is possible that several AAA servers may be implemented as part of network 200, each of which has associated therewith at least one ASN gateway and at least one base station.

When a second base station is able to more efficiently communicate with a mobile client device, usually because the client has moved closer to the second base station than a first base station, the first base station serving the mobile client device may hand over service to the second base station. Thus, the speed of the handover affects the continuity of service to the mobile client device. When the mobile client device is traveling at high rates of speed, handovers are more frequent because the client device is more quickly moving in and out of range of more base stations. In this situation, handover speed needs to be sufficient to ensure acceptable service to the client device.

Figure 3:
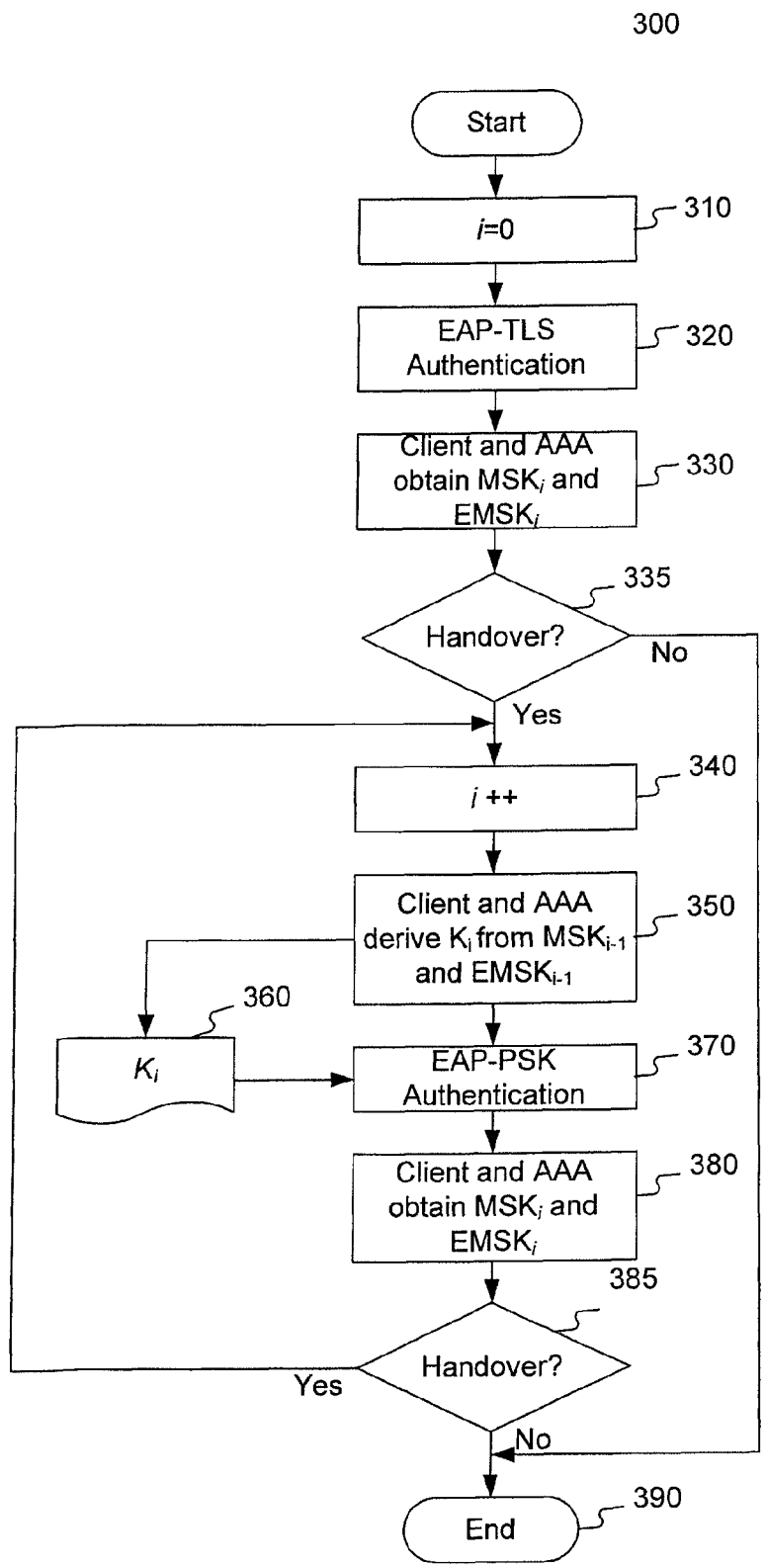
FIG. 3 illustrates a flow chart of an exemplary method for handover authentication, consistent with an embodiment of the invention.

FIG. 3 shows a flow chart of a method 300 for performing a wireless network handover authentication consistent with an embodiment of the invention. Reference will also be made to structural components of network 200 shown in FIG. 2. Method 300 is particularly adapted to situations in which a mobile client device, e.g., mobile client device 280, moves to a position requiring handover from one ASN gateway to another, e.g., from ASN gateway 250 to ASN gateway 255, but not requiring handover from a current AAA server, e.g., AAA server 210, to another AAA server. Although method 300 is presented to cover a broad range of operating situations, it is described herein with respect to a situation in which mobile client device 280 enters a service area initially requiring service by AAA server 210 via ASN gateway 250 and base station 260. Subsequently, client device 280 moves to an area requiring service by AAA server 210 via ASN gateway 255 and base station 265. As a result of such movement by client device 280, it is necessary for handover of client device 280 from ASN gateway 250 to ASN gateway 255.

Method 300 begins at 310 with AAA server 210 initializing a first variable i to zero. After variable i is initialized, an extensible authentication protocol (EAP) is used by AAA server 210 to perform a first authentication of client device 280 in the mobile WiMAX network environment (320). The first authentification may be performed in accordance with any one of a variety of conventional procedures, e.g., TLS (Transport Layer Security) according to the IEEE PKMv2 (Privacy and Key Management version 2) authentication procedure. The first authentication constitutes an initial authentication of client device 280 by AAA server 210 and may involve a significant amount of time and bandwidth.

Once the first authentication is successful, client device 280 and key generation unit 220 of AAA server 210 calculate and share first authentication keys $MSK_i$ and $EMSK_i$ (330). Upon completion of the first authentication, when i=0, the first authentication keys are designated herein as $MSK_0$ and $EMSK_0$. Next, handover determination unit 230 goes into a wait state until it determines that a handover of client device 280 will take place (335). As explained above, method 300 is adapted for the above-described handover of mobile client device 280 from ASN Gateway 250 to ASN Gateway 255, which maintains the same AAA server 210. If a user client device logs off the WiMAX network while handover determination unit 230 is still in a wait state i.e., before a handover determination unite 230 has determined a handover is to take place (335—No), the method ends.

If handover determination unit 230 determines that there should be a handover (335—Yes), key generator 220 increments variable i by one (340). At this point, both the AAA server 210 and the mobile client device 280 use the previously authenticated keys, more generally designated herein as $MSK_{i-1}$ and $EMSK_{i-1}$, because variable i has been incremented (350), to derive a handover authentication key $K_i$ in both key generator 220 of AAA server 210 and mobile client 280. This handover authentication key $K_i$ is generated as a shared key because key $K_i$ is derived in the same way from the previously authenticated keys $MSK_{i-1}$ and $EMSK_{i-1}$ by both key generator 220 of AAA server 210 and mobile client device 280 (360). After the shared authentication key $K_i$ is derived, handover authenticator 240 performs a handover authentication, serving as a second authentication, is performed using a shared key based EAP method using the shared key $K_i$ (370). As an example, EAP-PSK, EAP-MD5, or EAP-LEAP protocols are examples of shared key authentication methods that may be used to perform the second authentication. After the second authentication is successful, mobile client device 280 and AAA server 210 obtain post-handover authentication keys $MSK_i$ and $EMSK_i$, and handover authenticator 240 completes the handover (380).

Post-handover authentication keys $MSK_i$ and $EMSK_i$ are obtained by derivation of information exchanged between AAA server 210 and mobile client device 280 and information AAA server 210 and mobile client device 280 shared before. Examples of pre-handover shared information may include certificates and pre-shared keys. In some authentication and key agreement protocols, such as EAP-TLS for example, AAA server 210 and mobile client device 280 can compute keys $MSK_i$ and $EMSK_i$. As a result of obtaining keys $MSK_i$ and $EMSK_i$, mobile client device 280 can be served via ASN gateway 255. Since mobile client device 280 may continue moving after the handover is complete, handover determination unit 230 checks to determine if yet another handover is necessary (385). If another handover between ASN gateways, or base stations, is necessary (385—Yes), method 300 returns to increment variable i by one (340) and continues so long as mobile client device 280 is handed over to base stations controlled by the same AAA server 210 but a different ASN Gateway or base station. If a handover is not yet necessary (385), step 385 becomes a waiting step similar to step 335. The method will continue checking to determine whether a handover is necessary. The checks will continue until either a handover is necessary or the mobile client device logs off of the WiMAX network (385—No). Method 300 ends when a user logs off the WiMAX network (390).

In accordance with method 300, the processes of generating the shared handover authentication key $K_i$ (350, 360) and the shared key based authentication (370) together entail substantially less time and bandwidth than would be required to perform an entirely new authentication of mobile client device 280 such as performed for the first authentication (320). Thus, the use of the shared key shortens required handover authentication time, reduces the number of handover authentication steps as compared to conventional systems, reduces the volume of information to be transmitted for handover authentication, increases the efficiency of handover authentication, and increases a sense of seamlessness for client device 280.

Figure 4:
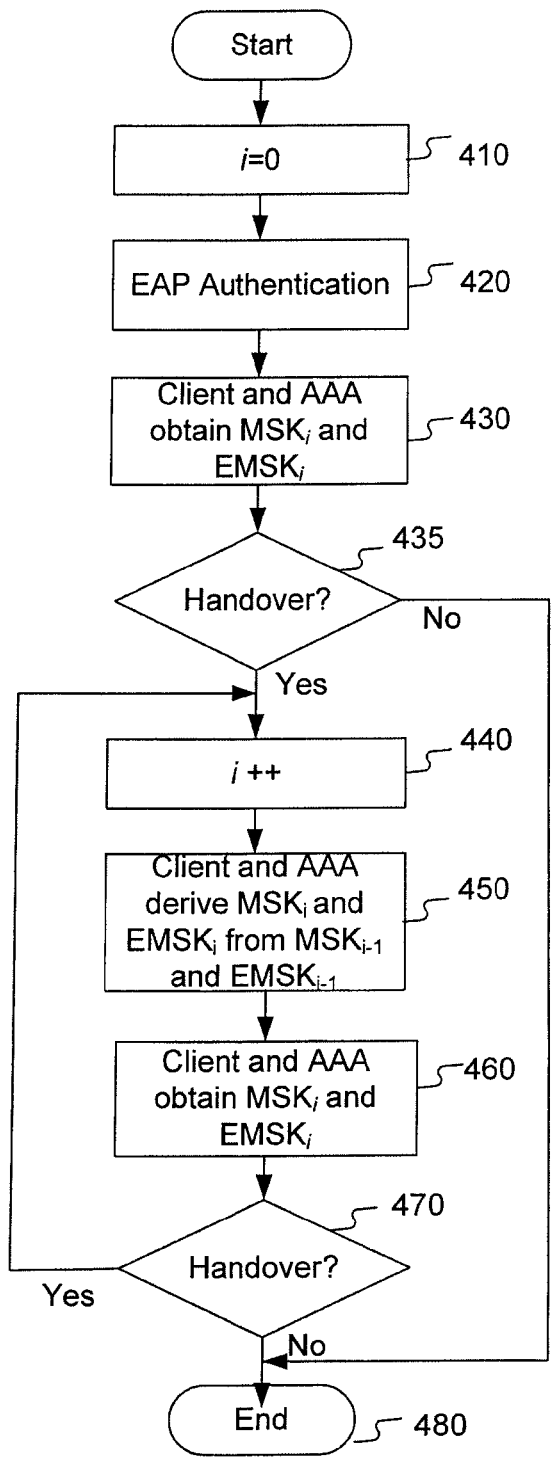
FIG. 4 illustrates a flow chart of an exemplary method for handover authentication, consistent with another embodiment of the invention.

FIG. 4 shows a flow chart of a method 400 for performing a wireless network handover authentication consistent with an embodiment of the invention. Reference will also be made to structural components shown in FIG. 2. As in the case of method 300, although method 400 is presented to cover a broad range of operating situations, it is described herein with respect to a situation in which mobile client device 280 enters a service area initially requiring service by AAA server 210 via ASN gateway 250 and base station 260. Subsequently, client device 280 moves to an area requiring service by AAA server 210 via ASN gateway 255 and base station 265. As a result of such movement by client device 280, it is necessary for handover of client device 280 from ASN gateway 250 to ASN gateway 255.

Method 400 begins at 410 with AAA server 210 initializing a first variable i to zero. After variable i is initialized, an extensible authentication protocol (EAP) is used by AAA server 210 to perform a first authentication of client device 280 in the mobile WiMAX network environment (420). The first authentication may be performed in accordance with any one of a variety of procedures, such as described above for first authentication 320 of method 300. Once the first authentication is successful, client device 280 and key generation unit 220 of AAA server 210 calculate and share first authentication keys $MSK_i$ and $EMSK_i$ (430). Upon completion of the first authentication when i=0, the first authentication keys are designated herein as $MSK_0$ and $EMSK_0$. Next, handover determination unit 230 determines whether or not a handover of client device 280 will take place (435). If a handover should not take place yet, handover determination unit 230 enters a wait state (435) until either a handover is to be completed (435—Yes), or the mobile client device 280 logs off the WiMAX network (435—No). As explained above, method 400 is adapted for the above-described handover of mobile client device 280 from ASN gateway 250 to ASN gateway 255. When mobile client device 280 logs off the WiMAX network, method 400 ends (480).

If handover determination unit 230 determines that there should be a handover (435—Yes), key generator 220 increments variable i by one (440). Next, both key generator 220 of AAA server 210 and mobile client device 280 use the authenticated keys from the previous authentication, now designated herein as $MSK_{i-1}$ and $EMSK_{i-1}$ because variable i has been incremented, to derive second authentication keys $MSK_i$ and $EMSK_i$ (450) that will be needed after handover of mobile client device 280 from ASN gateway 250 to ASN gateway 255. Second authentication keys $MSK_i$ and $EMSK_i$ are thus derived and shared between AAA server 210 and client device 280. As a result, no handover authentication is necessary in method 400, and handover takes place without authentication. Method 400 proceeds with mobile client device 280 and the AAA server 210 may obtain the post-handover authentication keys $MSK_i$ and $EMSK_i$ (460). Post-handover authentication keys $MSK_i$ and $EMSK_i$ are obtained by derivation of information exchanged between AAA server 210 and mobile client device 280 and information AAA server 210 and mobile client device 280 shared before. Examples of pre-handover shared information may include certificates and pre-shared keys. In some authentication and key agreement protocols, such as EAP-TLS for example, AAA server 210 and mobile client device 280 can compute keys $MSK_i$ and $EMSK_i$. Once the post-handover authentication keys are obtained, the handover is complete and mobile client 280 can be served via ASN gateway 255.

Depending on a specific application of method 400, it is possible that verifying the post-handover keys, e.g., $MSK_1$ and $EMSK_1$, between mobile client device 280 and AAA server 210 may be performed using an SA-TEK 3-way handshake as part of the PKMv2 process. The SA-TEK 3-way handshake may be used to mutually authenticate client device 280 and base station 260. Authentication between client device 280 and base station 260 occurs when the SA-TEK 3 way handshake authenticates one of client device 280 or base station 260 using keys derived from MSK. In this situation, handover authenticator 240 may not be necessary if client device 280 and AAA server 210 share the same keys, i.e., MSK and EMSK. When the SA-TEK 3-way handshake keys match, no further authentication is necessary. In this manner, the SA-TEK 3-way handshake may raise the overall efficiency of the handover.

Since mobile client device 280 continues moving after the handover is complete, handover determination unit 230 checks whether yet another handover is necessary (470). If another handover between ASN gateways is necessary (470—Yes), method 400 returns to increment variable i and continues so long as mobile client 280 is handed over to base stations controlled by the same AAA server, i.e., AAA server 210. If no handover is yet necessary, handover determination unit 230 enters a wait state (470) until either a handover is to be completed (470—Yes), or the mobile client device 280 logs off the WiMAX network (470—No). When mobile client device 280 logs off the WiMAX network, method 400 ends (480).

Method 400 omits the handover authentication by using the keys generated for the first authentication to generate the keys needed after handover, thereby shortening the required handover authentication time. Omitting the handover authentication thus reduces the number of handover authentication steps as compared to a conventional system, reduces the volume of information that must be transmitted for handover authentication, increases the efficiency of handover authentication, and increases a sense of seamlessness for a client user.

Moreover, the described implementations include software, but systems and methods consistent with the present invention may be implemented as a combination of hardware and software or in hardware alone. Examples of hardware include computing or processing systems, including personal computers, servers, laptops, mainframes, micro-processors and the like.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A handover authentication method in a wireless network, comprising:
    performing, by a wireless network server, a first authentication between a client and the wireless network server via a first network gateway using an extensible authentication protocol-transport layer security (EAP-TLS) protocol according to a Privacy and Key Management version 2 (PKMv2) authentication procedure;
    obtaining first authentication keys for the wireless network server and the client based on the first authentication;
    determining, by the wireless network server, a need to handover the client from the first network gateway to a second network gateway;
    deriving, by the wireless network server and from the first authentication keys, a handover authentication key shared by the client and the wireless network server;
    obtaining, by the wireless network server, second authentication keys for the network server and the client; and
    serving, by the wireless network server, the client via the second network gateway based on the second authentication keys.

2. The handover authentication method of claim 1 wherein, the client is a wireless electronic device.

3. The handover authentication method of claim 1, wherein the wireless network is a WiMAX, or WiFi network.

4. The handover authentication method of claim 1, further including providing the wireless network server as an AAA (access, authentication, and accounting) server.

5. The handover authentication method of claim 4, wherein the determining includes the AAA server determining the need to handover the client from the first network gateway provided as a first ASN (Access Service Network) gateway to the second network gateway provided as a second ASN gateway.

6. The handover authentication method of claim 4, wherein the performing of the handover authentication using the handover authentication key includes authenticating using any of EAP, EAP-PSK, EAP-MD5, or EAP-LEAP protocols.

7. The handover authentication method of claim 4, wherein the first network gateway comprises a first base station and the second network gateway comprises a second base station.

8. A handover authentication method in a wireless network, comprising:
    performing, by a wireless network server, a first authentication between a client and the wireless network server via a first network gateway using an extensible authentication protocol-transport layer security (EAP-TLS) protocol according to a Privacy and Key Management version 2 (PKMv2) authentication procedure;
    obtaining first authentication keys for the wireless network server and client based on the first authentication;
    determining, by the wireless network server, a need to handover the client from the first network gateway to a second network gateway;
    deriving, by the wireless network server and from the first authentication keys, second authentication keys shared by the client and the wireless network server; and
    serving, by the wireless network server, the client via the second network gateway based on the second authentication keys.

9. The handover authentication method of claim 8, wherein the client is a wireless electronic device.

10. The handover authentication method of claim 8, wherein the wireless network is a WiMAX or WiFi.

11. The handover authentication method of claim 8, further including providing the wireless network server as an AAA (access, authentication, and accounting) server.

12. The handover authentication method of claim 11, wherein the determining includes the AAA server determining the need to handover the client from the first network gateway provided as a first ASN (access service network) gateway to the second network gateway provided as a second ASN gateway.

13. The handover authentication method of claim 11, wherein the first network gateway comprises a first base station and the second network gateway comprises a second base station.

14. A network server for operating in a network serving a wireless client, the server comprising:
    means to perform a first authentication between a client and the wireless network server via a first network gateway using an extensible authentication protocol-transport layer security (EAP-TLS) protocol according to a Privacy and Key Management version 2 (PKMv2) authentication procedure;
    means to obtain first authentication keys for the wireless network server and the client based on the first authentication;
    means to determine a need to handover the client from the first network gateway to a second network gateway;
    means to derive, from the first authentication keys, a handover authentication key shared by the client and the wireless network server;
    means to obtain second authentication keys for the network server and the client; and
    means to serve the client via the second network gateway based on the second authentication keys.

15. The network server of claim 14, wherein the network server is an AAA (access, authentication, and accounting) server.

16. A network server for operation in a network serving a wireless client, the server comprising:
    means to perform a first authentication between a client and the wireless network server via a first network gateway using an extensible authentication protocol-transport layer security (EAP-TLS) protocol according to a Privacy and Key Management version 2 (PKMv2) authentication procedure;
    means to obtain first authentication keys for the wireless network server and the client based on the first authentication;
    means to determine a need to handover the client from the first network gateway to a second network gateway;
    means to derive, from the first authentication keys, second authentication keys shared by the client and the wireless network server; and
    means to serve the client via the second network gateway based on the second authentication keys.

17. The network server of claim 16, wherein the network server is an AAA (access, authentication, and accounting) server.

* * * * *